United States Patent
Hegde et al.

(10) Patent No.: US 11,306,037 B2
(45) Date of Patent: Apr. 19, 2022

(54) ENHANCED EFFICIENCY FERTILIZER WITH UREASE INHIBITOR AND NITRIFICATION SEPARATED WITHIN THE SAME PARTICLE

(71) Applicant: SABIC GLOBAL TECHNOLOGIES B.V., Bergen Op Zoom (NL)

(72) Inventors: Ravi Hegde, Bangalore (IN); Rajamalleswaramma Koripelly, Bangalore (IN); Chandra Mohana, Bangalore (IN); Radha Achanath, Bangalore (IN); Samik Gupta, Bangalore (IN); Sabeshan Kanagalingam, Bangalore (IN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 193 days.

(21) Appl. No.: 16/605,647

(22) PCT Filed: Apr. 12, 2018

(86) PCT No.: PCT/IB2018/052577
§ 371 (c)(1),
(2) Date: Oct. 16, 2019

(87) PCT Pub. No.: WO2018/193344
PCT Pub. Date: Oct. 25, 2018

(65) Prior Publication Data
US 2020/0140353 A1 May 7, 2020

Related U.S. Application Data

(60) Provisional application No. 62/487,247, filed on Apr. 19, 2017.

(51) Int. Cl.
*C05G 5/35* (2020.01)
*C05G 3/90* (2020.01)
(Continued)

(52) U.S. Cl.
CPC ............. *C05G 5/35* (2020.02); *C05C 9/00* (2013.01); *C05C 9/005* (2013.01); *C05C 11/00* (2013.01); *C05G 3/90* (2020.02)

(58) Field of Classification Search
None
See application file for complete search history.

(56) References Cited

U.S. PATENT DOCUMENTS 3,056,723 A 10/1962 Galloway
3,232,740 A 2/1966 Sor et al.
(Continued)

FOREIGN PATENT DOCUMENTS

AU 667645 2/1995
AU 2015212412 9/2016
(Continued)

OTHER PUBLICATIONS

Azeem, et al. "Review on materials & methods to produce controlled release coated urea fertilizer," *Journal of Controlled Release*, 2014, 181:11-21.
(Continued)

*Primary Examiner* — Wayne A Langel
(74) *Attorney, Agent, or Firm* — Norton Rose Fulbright US LLP

(57) ABSTRACT

Fertilizer particles with urease inhibitors and nitrification inhibitors are described herein. The fertilizer particles can include a core particle comprising a urease inhibitor and an outer layer comprising a nitrification inhibitor.

20 Claims, 3 Drawing Sheets

(51) Int. Cl.
  *C05C 9/00* (2006.01)
  *C05C 11/00* (2006.01)

(56) References Cited

U.S. PATENT DOCUMENTS

| | | | |
|---|---|---|---|
| 3,300,294 A | 1/1967 | Hollstein |
| 3,314,778 A | 4/1967 | Campbell et al. |
| 3,322,528 A | 5/1967 | Hamamoto |
| 3,326,665 A | 7/1967 | Schäfer et al. |
| 3,331,677 A | 7/1967 | Campbell et al. |
| 3,388,989 A | 6/1968 | Sor |
| 3,400,011 A | 9/1968 | Fox |
| 3,441,539 A | 4/1969 | Schafer et al. |
| 3,499,748 A | 3/1970 | Fraser |
| 3,825,414 A | 6/1974 | Lee et al. |
| 3,870,755 A | 3/1975 | Kamo et al. |
| 3,954,436 A | 5/1976 | Vad et al. |
| 3,961,329 A | 7/1976 | Naidich |
| 3,962,329 A | 7/1976 | Schoenaich et al. |
| 4,062,890 A | 12/1977 | Shank |
| 4,082,533 A | 4/1978 | Wittenbrook et al. |
| 4,880,455 A | 11/1989 | Blank |
| 4,994,100 A | 2/1991 | Sutton et al. |
| 5,124,451 A | 7/1992 | Hackl et al. |
| 5,169,954 A | 12/1992 | Hackl et al. |
| 5,219,465 A | 6/1993 | Goertz et al. |
| 5,264,019 A | 11/1993 | Gossett, Jr. et al. |
| 5,300,135 A | 4/1994 | Hudson et al. |
| 5,352,265 A | 10/1994 | Weston et al. |
| 5,399,186 A | 3/1995 | Derrah et al. |
| 5,405,426 A | 4/1995 | Timmons |
| 5,414,083 A | 5/1995 | Hackl et al. |
| 5,466,274 A | 11/1995 | Hudson et al. |
| 5,476,528 A | 12/1995 | Trimm |
| 5,597,917 A | 1/1997 | Hackl et al. |
| 5,645,624 A | 7/1997 | Naka et al. |
| 5,741,521 A | 4/1998 | Knight et al. |
| 5,803,946 A | 9/1998 | Petcavich et al. |
| 5,851,261 A | 12/1998 | Markusch et al. |
| 5,862,610 A | 1/1999 | Lipert |
| 5,917,110 A | 6/1999 | Kust |
| 5,976,210 A | 11/1999 | Sensibaugh |
| 6,048,376 A | 4/2000 | Miller |
| 6,048,378 A | 4/2000 | Moore |
| 6,231,633 B1 | 5/2001 | Hirano et al. |
| 6,391,454 B1 | 5/2002 | Mao et al. |
| 6,489,438 B1* | 12/2002 | Erhardt ............... C05D 9/00 |
| | | | 528/391 |
| 6,500,223 B1 | 12/2002 | Sakai et al. |
| 6,576,035 B2 | 6/2003 | Hartmann et al. |
| 6,749,659 B1 | 6/2004 | Yu et al. |
| 6,900,162 B2 | 5/2005 | Wertz et al. |
| 6,936,573 B2 | 8/2005 | Wertz et al. |
| 6,936,681 B1 | 8/2005 | Wertz et al. |
| 7,213,367 B2 | 5/2007 | Wertz et al. |
| 8,163,058 B2 | 4/2012 | Whitehurst |
| 8,419,819 B2 | 4/2013 | Sutton |
| 8,603,211 B2 | 12/2013 | Rahn et al. |
| 9,034,072 B2 | 5/2015 | Gabrielson et al. |
| 9,376,350 B2 | 6/2016 | Pursell et al. |
| 9,394,210 B2 | 7/2016 | Gabrielson et al. |
| 9,422,203 B2 | 8/2016 | Waliwitiya |
| 9,446,993 B2 | 9/2016 | Li et al. |
| 2003/0205072 A1* | 11/2003 | Van Der Merwe ..... C05F 11/00 |
| | | | 71/27 |
| 2003/0224031 A1 | 12/2003 | Heier et al. |
| 2004/0001884 A1 | 1/2004 | Moroni et al. |
| 2004/0016275 A1 | 1/2004 | Hartmann et al. |
| 2004/0016276 A1 | 1/2004 | Wynnyk et al. |
| 2004/0050127 A1 | 3/2004 | Ambri |
| 2004/0163434 A1 | 8/2004 | Quin |
| 2004/0182953 A1 | 9/2004 | Knoer |
| 2006/0089259 A1 | 4/2006 | Driessen et al. |
| 2006/0142157 A1 | 6/2006 | Birthisel et al. |
| 2009/0270257 A1 | 10/2009 | Pursell et al. |
| 2009/0317468 A1 | 12/2009 | Letmathe et al. |
| 2010/0011825 A1 | 1/2010 | Ogle et al. |
| 2010/0139348 A1 | 6/2010 | Wan et al. |
| 2011/0036009 A1 | 2/2011 | Bissonnette et al. |
| 2011/0154873 A1 | 6/2011 | Burnham et al. |
| 2011/0275520 A1 | 11/2011 | Frey et al. |
| 2012/0017659 A1 | 1/2012 | Pursell et al. |
| 2012/0067094 A1 | 3/2012 | Pursell et al. |
| 2012/0090366 A1 | 4/2012 | Pursell et al. |
| 2013/0152649 A1 | 6/2013 | Kweeder et al. |
| 2013/0231493 A1 | 9/2013 | Shishkov et al. |
| 2013/0305796 A1 | 11/2013 | Hudson et al. |
| 2014/0033779 A1 | 2/2014 | Bertin et al. |
| 2014/0047884 A1 | 2/2014 | Gabrielson et al. |
| 2014/0102156 A1 | 4/2014 | Pursell et al. |
| 2014/0223978 A1 | 8/2014 | Kuo et al. |
| 2014/0230322 A1 | 8/2014 | Zhang et al. |
| 2014/0255605 A1 | 9/2014 | Van Kaathoven et al. |
| 2015/0031786 A1 | 1/2015 | Lambeth |
| 2015/0047402 A1 | 2/2015 | Walker et al. |
| 2015/0052960 A1 | 2/2015 | Makin et al. |
| 2015/0101379 A1 | 4/2015 | Gabrielson et al. |
| 2015/0125639 A1 | 5/2015 | Rosen |
| 2015/0152017 A1 | 6/2015 | Schumski et al. |
| 2015/0197460 A1 | 7/2015 | Gabrielson et al. |
| 2015/0239790 A1 | 8/2015 | Iwig et al. |
| 2015/0291481 A1 | 10/2015 | Neff et al. |
| 2016/0075609 A1 | 3/2016 | Gabrielson et al. |
| 2016/0076062 A1 | 3/2016 | Medoff et al. |
| 2016/0185682 A1* | 6/2016 | Katz ..................... C05C 11/00 |
| | | | 71/28 |
| 2016/0340265 A1 | 11/2016 | Kanagalingam et al. |
| 2017/0088480 A1 | 3/2017 | Kannan et al. |
| 2017/0362139 A1 | 12/2017 | Zhang et al. |
| 2018/0022661 A1 | 1/2018 | Achille et al. |
| 2018/0208513 A1 | 7/2018 | Kanagalingam et al. |
| 2018/0208519 A1 | 7/2018 | Kanagalingam et al. |
| 2018/0297903 A1 | 10/2018 | Ledoux et al. |
| 2020/0039893 A1 | 2/2020 | Koripelly et al. |
| 2020/0131098 A1 | 4/2020 | Hegde et al. |
| 2020/0140353 A1 | 5/2020 | Hegde et al. |

FOREIGN PATENT DOCUMENTS

| | | |
|---|---|---|
| CA | 2441175 | 3/2004 |
| CA | 2701995 | 10/2011 |
| CN | 1044450 A | 8/1990 |
| CN | 1126465 | 7/1996 |
| CN | 1145059 | 3/1997 |
| CN | 1417172 A | 5/2003 |
| CN | 1666972 | 9/2005 |
| CN | 101108781 | 7/2006 |
| CN | 1298679 | 2/2007 |
| CN | 101037371 | 9/2007 |
| CN | 101134695 | 3/2008 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101486614 | 7/2009 |
| CN | 101638348 | 2/2010 |
| CN | 101723752 | 6/2010 |
| CN | 102143927 | 8/2011 |
| CN | 102267842 | 12/2011 |
| CN | 102295491 | 12/2011 |
| CN | 102432388 | 5/2012 |
| CN | 102557838 | 7/2012 |
| CN | 102746073 | 10/2012 |
| CN | 102826917 | 12/2012 |
| CN | 102951968 | 3/2013 |
| CN | 103319120 | 9/2013 |
| CN | 103588576 | 2/2014 |
| CN | 103755450 | 4/2014 |
| CN | 103755498 | 4/2014 |
| CN | 103772074 | 5/2014 |
| CN | 103787798 | 5/2014 |
| CN | 103833490 | 6/2014 |
| CN | 103102216 | 12/2014 |

(56) References Cited

FOREIGN PATENT DOCUMENTS

| | | |
|---|---|---|
| CN | 104177201 | 12/2014 |
| CN | 104230529 A | 12/2014 |
| CN | 104230575 | 12/2014 |
| CN | 104261723 | 1/2015 |
| CN | 104276877 | 1/2015 |
| CN | 104311366 | 1/2015 |
| CN | 104326847 | 2/2015 |
| CN | 102936169 | 4/2015 |
| CN | 104557278 | 4/2015 |
| CN | 105669332 | 6/2016 |
| DE | 1146080 | 3/1963 |
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1043295 | 10/2000 |
| EP | 1067093 | 12/2004 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |
| GB | 1535807 | 12/1978 |
| JP | 348780 | 7/1991 |
| JP | H07-033576 | 2/1995 |
| JP | H1116798 | 4/1999 |
| JP | H11263689 | 9/1999 |
| JP | H11278973 | 10/1999 |
| JP | 2001294792 | 10/2001 |
| KR | 100974639 | 8/2010 |
| KR | 101485578 | 12/2014 |
| NZ | 596113 | 8/2012 |
| SU | 429048 | 5/1974 |
| TW | 1549926 | 9/2016 |
| WO | WO 1989/000079 | 1/1989 |
| WO | WO 1995/026942 | 10/1995 |
| WO | WO 1996/018591 | 6/1996 |
| WO | WO 2003/006399 | 1/2003 |
| WO | WO 2003/045877 | 6/2003 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | WO 2007/022732 | 3/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2013/128402 | 9/2013 |
| WO | WO 2014/189183 | 11/2014 |
| WO | WO 2015/001457 | 1/2015 |
| WO | 2015/114542 A1 * | 8/2015 ............... C05G 3/08 |
| WO | WO 2015/114542 | 8/2015 |
| WO | WO 2015/170217 | 11/2015 |
| WO | WO 2016/091205 | 6/2016 |
| WO | WO 2016/107548 | 7/2016 |
| WO | WO 2016/186526 | 11/2016 |
| WO | WO 2017/013572 | 1/2017 |
| WO | WO 2017/013573 | 1/2017 |
| WO | WO 2017/081183 | 5/2017 |
| WO | WO 2017/087264 | 5/2017 |
| WO | WO 2017/087265 | 5/2017 |
| WO | WO 2017/100507 | 6/2017 |
| WO | WO 2017/137902 | 8/2017 |
| WO | WO 2017/168288 | 10/2017 |
| WO | WO 2018/162533 | 9/2018 |
| WO | WO 2018/193344 | 10/2018 |
| WO | WO 2018/193345 | 10/2018 |
| WO | WO 2018/193358 | 10/2018 |
| WO | WO 2019/030671 | 2/2019 |
| ZA | 201105819 | 4/2012 |

OTHER PUBLICATIONS

Babu, et al. "Current Progress on bio-based polymers and their future trends," *Progress in Biomaterials*, 2013, 2:8.
Extended European Search Report issued in counterpart European Patent Application No. 20166713.6, dated Nov. 11, 2020.
Extended European Search Report issued in European Application No. 1686688.7, dated Jun. 13, 2019.
International Search Report and Written Opinion issued in International Patent Application No. PCT/IB2017/050683, dated Jun. 20, 2017.
Lubkowski, "Coating Fertilizer Granules with Biodegradable Materials for Controlled Fertilizer Release," Environmental Engineering and Management Journal, 2014, 13:2573-2581.
Office Action issued in corresponding Chinese Patent Application No. 201680051728.4, dated Aug. 11, 2020.
Office Action issued in counterpart Chinese Patent Application No. 201680051745.8, dated Dec. 2, 2020.
Search Report issued in corresponding Chinese Patent Application No. 201680051745.8, dated Jul. 2, 2019.
Search Report issued in corresponding Chinese Patent Application No. 201680051728.4, dated Aug. 5, 2020.
Yixing, et al. "Application Technology of Novel Slow and Controlled Release Fertilizer," *China Three Gorges Press*, 2008, 1, pp. 90 and 92.
Yongkang, et al. "Modern Drying Technology," *Chemical Industry Press*, 2007, 1:719-722.
Al-Kanani et al., "Volatilization of ammonia from urea-ammonium nitrate solutions as influenced by organic and inorganic additives." *Fertilizer research* 1990, 23, 113-119.
Allison, "The enigma of soil nitrogen balance sheets," *Adv. Agro.* 1995, 7:213-250.
Al-Zahrani, S.M., "Utilization of Polyethylene and Paraffin Waxes as Controlled delivery Systems for Different Fertilizers" *Ind. Eng. Chem. Res.*, 2000, 39(2):367-371.
Bolan et al., "Soil Acidification and Liming Interactions with Nutrient and Heavy Metal Transformation and Bioavailability," *Advances in Agronomy*, 2003, 78:215-272.
Bose, et al., "New protocol for Biginelli reaction—a practical synthesis of Monastrol," *ARKIVOC*, 2005, 3:228-236.
Chien, et al., "Recent Developments of Fertilizer Production and Use to Improve Nutrient Efficiency and Minimize Environmental Impacts," *Advances in Agronomy*, 2009, 102(8):267-322.
Ciurli, et al. "Structural properties of the nickel ions in; urease: novel insights into the catalytic and inhibition mechanisms," *Coord. Chem. Rev.* 1999, 331:190-192.
Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.
Gioacchini, et al., "Influence of urease and nitrification inhibitors on N losses from soils fertilized with urea," *Biology and Fertility of Soils*, 2002, 36(2):129-135.
Hays, "Symposium on Controlled Release Fertilizer," *J. Agri. Food*, 1971, 19:797.
International Preliminary Report on Patentability issued in counterpart International Patent Application No. PCT/IB2015/050654, dated Aug. 2, 2016.
International Preliminary Report on Patentability issued in International Patent Application No. PCT/IB2016/054271, dated Oct. 18, 2017.
International Search Report and Written Opinion issued in counterpart International Patent Application No. PCT/IB2015/050654, dated May 19, 2015.
International Search Report and Written Opinion issued in counterpart International Patent Application No. PCT/IB2016/054271, dated Oct. 24, 2016.

(56) References Cited

OTHER PUBLICATIONS

International Search Report and Written Opinion issued in counterpart International Application No. PCT/IB2015/053056, dated Sep. 23, 2015.
International Search Report and Written Opinion issued in International Patent Application No. PCT/IB2018/052577, dated Aug. 1, 2018.
International Search Report and Written Opinion issued in International Patent Application No. PCT/IB2018/052578, dated Aug. 1, 2018.
International Search Report and Written Opinion issued in International Patent Application No. PCT/IB2018/052630, dated Aug. 9, 2018.
International Search Report and Written opinion issued in International Application No. PCT/IB2018/055946, dated Dec. 3, 2018.
International Search Report and Written opinion issued in International Application No. PCT/IB2016/054270, dated Oct. 24, 2016.
International Search Report and Written Opinion issued in International Application No. PCT/IB2017/050683, dated Jun. 20, 2017.
International Search Report and Written Opinion issued in International Patent Application No. PCT/US2016/061486, dated Jan. 25, 2017.
International Search Report and Written Opinion issued in International Patent Application No. PCT/US2016/061487, dated Jan. 5, 2017.
Jarosiewicz & Tomaszewska, "Controlled-release NPK fertilizer encapsulated by polymeric membranes." *Journal of Agricultural and Food Chemistry*, 2003, 51(2):413-417.
Kawakami, et al., "Physiological and yield responses of field-grown cotton to application of urea with the urease inhibitor NBPT and the nitrification inhibitor DCD," *European Journal of Agronomy*, 2012, 43:147-154.
Lunt, et al., "Properties and Value of 1,1-Diureido Isobutane (IBDU) as a Long-Lasting Nitrogen Fertilizer," *J. Agr. Food Chem.*, 1969, 17(6):1269-1271.
Mahmood et al., "Calcium Carbide-Based Formulations cause Slow Release of Acetylene and Ethylene in Soil and Nitrification Inhibition," *Communications in Soil Science and Plant Analysis*, 2014, 45(17): 2277-2288.
Mahmood et al., "Effect of rate and application depth matrix-I calcium carbide based formulation on growth, yield and nitrogen uptake of wheat," *African Journal of Agricultural Research*, 2011, 6(30): 6363-6398.
Mahmood et al., "Nutritional and physiological response of wheat to soil applied matrix-I formulated calcium carbide with and without nitro gen fertilizer," *Pakistan Journal of Nutrition* 2012, 11(2): 154-159.
Office Action and Search Report issued in Corresponding Taiwanese Patent Application No. 104114189, dated May 9, 2019.
Office Action issued in corresponding Chinese Patent Application No. 201580008733.2, dated Jan. 11, 2019. (Machine Translation Provided).
Office Action issued in corresponding Chinese Patent Application No. 2015800087332, dated Jun. 13, 2019.
Office Action issued in corresponding Chinese Patent Application No. 201680051745.8, dated Jul. 23, 2019.
Office Action issued in corresponding Indian Patent Application No. 201617028561, dated Jun. 18, 2019.
Office Action issued in corresponding Taiwan Patent Application No. 105122936, dated Sep. 5, 2019.
Office Action issued in European Patent Application No. 16741394.7, dated Dec. 7, 2018.

Patra, et al., "Use of urea coated with natural products to inhibit urea hydrolysis and nitrification in soil," *Biol. Fertil. Soils*, 2009, 45:617-621.
Reddy, et al., New environmentally friendly solvent free syntehesis of dihydropyrimidinones catalysed by N-butyl-N, N-dimethylphenylethylammonium bromide, *Tetrahedron Letters*, 2003, 44:8173-8175.
Sanz-Cobena, et al., "Gaseous emissions of N2O and NO and NO3—leaching from urea applied with urease and nitrification inhibitors to a maize (*Zea mays*) crop," *Agriculture, Ecosystems & Environment*, 2012, 149:64-73.
Sinclair et al., "Radiation Use Efficiency," *Advances in Agronomy* 1999, 65: 215-265.
Soares, et al., "Ammonia volatilization losses from surface-applied urea with urease and nitrification inhibitors," *Soil Biology and Biochemistry*, 2012, 52:82-89.
Subbarao, et al., "Scope and Strategies For Regulation of Nitrification in Agricultural Systems—Challenges and Opportunities," *Crit. Rev. Plant Sci.*, 2006, 25-303-335.
Trenkel, "Controlled-release and stabilized fertilizers in agriculture." *International fertilizer industry association* 1997, 11:1-156.
Upadhyay, "Urease inhibitors: A review." *Indian Journal of Biotechnology* 2012, 11:381-388.
Watson, et al., "Rate and mode of application of the urease inhibitor N-(n-butyl) thiophosphoric triamide on ammonia volatilization from surface-applied urea," *Soil Use and Management*, 2008, 24:246-253.
Wu, et al., "Guidelines For The Use of Fertilizers," *Chinese Agricultural Press*, 2000, 122-123. (English Translation).
Zaman, et al., "Effects of urease and nitrification inhibitors on the efficient use of urea for pastoral systems," *J. Soil Science and Plant Nutrition*, 2013, 59(4):649-659.
Zaman, et al., "Improving pasture growth and urea efficiency using N inhibitor, molybdenum and elemental Sulphur," *Journal of Soil Science and Plant Nutrition*, 2014, 14(1):245-257.
Lookchem. "Hydroxypropyl methyl cellulose," https://www.lookchem.com/Hydroxypropyl-methyl-cellulose/ pp. 1-2, 2015.
Dongpo et al., "Soil biological activities at maize seedling stage under application of slow/controlled release nitrogen fertilizers" *Chinese Journal of Applied Ecology* 2006, 17(6), 1055-1059 (English Translation of conclusion).
Office Action issued in Corresponding Chinese Application No. 201680051728.4, dated Jun. 3, 2021 (No English Translation provided).
Office Action issued in Corresponding Chinese Application No. 201911019580.8, dated Jul. 13, 2021 (English Translation provided).
Office Action issued in Corresponding Chinese Application No. 201880039588.8, dated Jul. 14, 2021 (English Translation provided).
Martin R.J., et al.: Comparison of Agrotain-treated and standard urea on an irrigated dairy pasture, Proceedings of the New Zealand Grassland Association, vol. 70, 2008, Blenheim, pp. 91-94.
Office Action issued in counterpart New Zealand Patent Application No. 723446, dated Nov. 11, 2021.
Zhang J., et al.: Heat Capacity and Thermal Decomposition of Dicyandiamide, Thermochimica Acta, vol. 307, Issue 1, 1997, pp. 11-15, ISSN 0040-6031.
Office Action issued in corresponding Chinese Application No. 201880040046.2, dated Sep. 1, 2021.
Office Action issued in corresponding Chinese Application No. 202010394499.4, dated Oct. 9, 2021.
Office Action issued in corresponding Chinese Application No. 201680051728.4, dated Oct. 27, 2021.

* cited by examiner

ENHANCED EFFICIENCY FERTILIZER WITH UREASE INHIBITOR AND NITRIFICATION SEPARATED WITHIN THE SAME PARTICLE

CROSS REFERENCE TO RELATED APPLICATIONS

This application is a national phase application under 35 U.S.C. § 371 of International Application No. PCT/IB2018/052577, filed Apr. 12, 2018, which claims the benefit of priority of U.S. Provisional Patent Application No. 62/487,247 filed Apr. 19, 2017, which are hereby incorporated by reference in their entirety.

BACKGROUND OF THE INVENTION

A. Field of the Invention

The invention generally concerns fertilizer particles that include urease inhibitors and nitrification inhibitors. The urease and nitrification inhibitors are separated from each other within the particle, with the urease inhibitor being included in a core particle and the nitrification inhibitor being included in a solid composition that at least partially surrounds the core particle.

B. Description of Related Art

To increase crop yield and satisfy the growing needs of an increasing population, more fertilizers are being used in agriculture. However, continuous use of fertilizer can lead to nutrient imbalance and loss of soil fertility. In addition, extensive use of urea fertilizer, due to its rapid hydrolysis and nitrification in the soil by soil bacteria, can cause deterioration of soil health and other environmental problems such as greenhouse emissions and groundwater contamination.

Hydrolysis and nitrification of urea in soil can be counteracted by adding urease inhibitors and nitrification inhibitors to the fertilizer. Urease inhibitors reduce the amount of urea hydrolyzed, which reduces the amount of nitrogen lost through ammonia volatilization. Nitrification inhibitors reduce the rate of conversion of ammonium into nitrate, which also reduces the amount of nitrogen lost. Nitrification inhibitors are effective at enhancing efficiency of a variety of nitrogen fertilizers in addition to urea.

While use of urease inhibitors and nitrification inhibitors in fertilizers has been employed as a solution to the problems of urea hydrolysis and nitrification, there are certain difficulties in using these inhibitors. One problem is that some inhibitors are heat sensitive, which complicates the manufacturing process for fertilizers that include such inhibitors. For example, adding a heat-sensitive inhibitor to molten urea before granulation can cause substantial degradation of the inhibitor, as described in Soil Use & Management, 24:246 (2008). To compensate for this problem, some fertilizer manufacturers may add an excess of inhibitor to the urea melt, which increases the cost of producing the fertilizer. Another problem is that some combinations of inhibitors can be incompatible if included in the same particle. For example, the inventors of the present application have observed that the nitrification inhibitor dicyandiamide (DCD) can cause stability problems if combined with the urease inhibitor N-(n-butyl) thiophosphoric triamide (NBTPT). Without wishing to be bound by theory, it is commonly known that, under storage conditions, DCD increases the degradation of NBTPT, which is both thermal as well as moisture sensitive.

SUMMARY OF THE INVENTION

A solution to the aforementioned problems has been discovered. In some embodiments, the solution resides in providing a fertilizer particle with a urease inhibitor and a nitrification inhibitor separated from one another within the particle. Such fertilizer particles can include a core particle that includes a urease inhibitor and an outer layer, or shell, that includes a nitrification inhibitor. In such a particle, the urease inhibitor and nitrification inhibitor can be separated from each other, preventing any degradation effects that the inhibitors may have on each other. Furthermore, the manufacturing process of making such particles can provide protection against heat degradation for the inhibitor that is included in the core particle. This is accomplished by adding a heat-sensitive inhibitor, for example NBTPT, to the core particle instead of to a relatively hot composition, such as molten urea, during the process of making the fertilizer particles. The other ingredients in the core particle help provide a buffer against heat during the manufacturing process, reducing the amount of inhibitor lost to heat degradation.

Disclosed herein is a fertilizer particle that includes: (a) a core particle that includes a urease inhibitor and a binder; and (b) a nitrogen fertilizer-containing composition in contact with the outer surface of the core particle and can include a nitrification inhibitor. In some embodiments, the urease inhibitor can include N-(n-butyl) thiophosphoric triamide (NBTPT). In some embodiments, the nitrification inhibitor can include dicyandiamide (DCD). In some embodiments, the amount of the urease inhibitor in the core particle is between about 1 and 20 wt % of the core particle. In some embodiments the amount of the urease inhibitor in the core particle is about 0.1, 0.5, 1.0, 1.5, 2.0, 2.5, 3.0, 3.5, 4.0, 4.5, 5.0, 6.0, 7.0, 8.0, 9.0, 10.0 wt % of the core particle or is between any two of those values. Preferably, the amount is between about 0.1 and 5 wt %. In some embodiments, the amount of the nitrification inhibitor in the nitrogen fertilizer-containing composition is between about 0.5 and 10 wt % of the nitrogen fertilizer-containing composition. In some embodiments the amount of the nitrification inhibitor in the nitrogen fertilizer-containing composition is about 0.1, 0.5, 0.6, 0.7, 0.8, 0.9, 1.0, 1.1, 1.2, 1.3, 1.4, 1.5, 1.6, 1.7, 1.8, 1.9, 2.0, 3, 4, 5, 6, 7, 8, 9, or 10 wt % of the nitrogen fertilizer-containing composition or is between any two of those values. Preferably, the amount is between about 0.1 and 2%. In some embodiments, the core particle includes no nitrification inhibitor, no more than trace amounts of nitrification inhibitor, and/or no more than 0.01, 0.05, or 0.1 wt % of nitrification inhibitor. In some embodiments, the core can contain nitrification inhibitor while the nitrogen fertilizer contains urease inhibitor. In some embodiments, urease inhibitor is excluded from either the core or the nitrogen-fertilizer containing composition. In some embodiments, nitrification inhibitor is excluded from either the core or the nitrogen-fertilizer containing composition. In some embodiments, the core particle is absent urease inhibitor, includes no more than trace amounts of urease inhibitor, and/or includes no more than 0.01, 0.05, or 0.1 wt % of urease inhibitor. In some embodiments, the nitrogen fertilizer-containing composition is absent urease inhibitor, includes no more than trace amounts of urease inhibitor, and/or includes no more than 0.01, 0.05, or 0.1 wt % of urease inhibitor. In some embodiments, the nitrogen fertilizer-containing composition is absent nitrification inhibitor, includes no more than trace amounts of nitrification inhibitor, and/or includes no more than 0.01, 0.05, or 0.1 wt % of nitrification inhibitor.

In some embodiments, the core particle can include substances in addition to the urease inhibitor and the binder, such as a filler, a pH balancing agent, and a polymer thickener.

A binder in the core particle can help to keep the core particle from breaking or crumbling during the manufacturing process or storage. In some embodiments, the binder can include one or more of plaster of Paris, flour, biodegradable bleached wheat flour, starch, gluten, kaolin, bentonite, or colloidal silica, including mixtures thereof. Other suitable binders known in the art may also be used. In some embodiments, the binder is present in the core particle in an amount between 10 and 99 wt % of the core particle. In some embodiments, the binder is present in the core particle in an amount of about 10, 15, 20, 25, 30, 35, 40, 45, 50, 55, 60, 65, 70, 75, 80, 85, 90, 95, 98, or wt % of the core particle or between any two of those values.

In some embodiments, the filler in the core particle can include one or more of silica, dried distillers grains with solubles (DDGS), or rice husk, or mixtures thereof. Other suitable fillers known in the art may also be used. In some embodiments, the filler is present in the core particle in an amount between greater than 0 and 60 wt % of the core particle. In some embodiments, the filler is present in the core particle in an amount of about 1, 5, 10, 15, 20, 25, 30, 35, 40, 45, 50, 55, or 60 wt % of the core particle or between any two of those values.

In some embodiments, the pH buffering agent in the core particle can include one or more of chalk powder, $CaCO_3$, $Na_2CO_3$, $K_2CO_3$, MgO, $KH_2PO_4$, $NaHCO_3$, or $MgCO_3$ or mixtures thereof. In some embodiments, the filler is present in the core particle in an amount between about 5 and 60 wt % of the core particle. In some embodiments, the filler is present in the core particle in an amount of about 5, 10, 15, 20, 25, 30, 35, 40, 45, 50, 55, or 60 wt % of the core particle or between any two of those values. In some embodiments, a pH buffering agent can also function as a filler. For example, in some embodiments, $CaCO_3$ is used as both the filler and as the pH buffering agent, and no other fillers or pH buffering agents are included in the core particle.

In some embodiments, the polymer thickener in the core particle can include one or more of hydroxypropyl methylcellulose, carboxymethyl cellulose, hydroxyethyl cellulose, polyethylene glycol (PEG), guar gum, locust bean gum, xanthan gum, other natural gums, or synthetic polymers based on acrylates, polyacrylamide (PAM), PVP, or combinations of synthetic polymers and carbomers. In some embodiments, the polymer thickener is present in an amount between 0.1 and 1 wt % of the core particle. In some embodiments, the polymer thickener is present in an amount of about 0.1, 0.2, 0.3, 0.4, 0.5, 0.6, 0.7, 0.8, 0.9, or 10 wt % of the core particle or between any two of those values.

In some embodiments, the core particle can include between 35 and 55 wt % binder, between 35 and 45 wt % filler, 35 and 45 wt % pH buffering agent, between 0.1 and 1 wt % polymer thickener, and between 1 and 2.2 wt % of a urease inhibitor.

In some embodiments, the fertilizer particle can include the following ingredients in the indicated amounts, with the amounts being given as the percent of the ingredient by weight in relation to the whole fertilizer particle: 1-5 wt % binder, 1-5 wt % filler, 1-5 wt % pH buffering agent, 0.01-0.1 wt % polymer, 0.05-0.2 wt % urease inhibitor, 90-95 wt % nitrogen fertilizer, and 0.5-2 wt % nitrification inhibitor.

In some embodiments, the nitrogen fertilizer-containing composition substantially or fully surrounds the core particle. In some embodiments, the nitrogen fertilizer-containing composition covers at least 90, 95, or 99% of the surface of the core particle. In embodiments in which the urea-containing composition fully surrounds the core particle, the nitrogen fertilizer-containing composition covers 100% of the surface of the core particle. In some embodiments, the nitrogen fertilizer-containing composition includes urea. In some embodiments, the amount of urea in the nitrogen fertilizer-containing composition is between 10 and 99.9 wt % of the nitrogen fertilizer-containing composition. In some embodiments, the urea is present in the nitrogen fertilizer-containing composition in an amount of about 10, 15, 20, 25, 30, 35, 40, 45, 50, 55, 60, 65, 70, 75, 80, 85, 90, 95, 99, or 99.9 wt % or between any two of those values.

In some embodiments, the fertilizer particle is a core-shell particle that includes: (a) a core particle that includes NBTPT and a binder; and (b) a urea-containing composition in contact with the outer surface of the core particle and can include DCD. A core-shell particle as used herein is one in which a solid particle is surrounded by a different solid composition. In some embodiments, the shell is a layer of a solid urea-containing composition that substantially or fully encompasses the core particle.

Also disclosed is a fertilizer particle that includes a core particle and a shell surrounding the core particle, wherein the core particle can include (a) either a urease inhibitor or a nitrification inhibitor, and (b) either a binder or urea. In such embodiments, the core particle can include urea and a urease inhibitor, urea and a nitrification inhibitor, binder and a urease inhibitor, or binder and a nitrification inhibitor. In these embodiments, the shell portion of the particle can include the two substances out of the urease inhibitor, nitrification inhibitor, binder, and urea that are not present in the core particle. For example, if the core particle includes urea and a urease inhibitor, the shell can include a binder and a nitrification inhibitor; or if the core particle includes a binder and a nitrification inhibitor, the shell can include urea and a urease inhibitor. In some instances, the core particle can include urea, a urease inhibitor, a nitrification inhibitor and at least one of a binder, a filler, a pH buffering agent and/or a polymer thickener. Such core particles can be fattened with urea to form a shell substantially surrounding the core. The urea can contain a fertilizer active, for example, DCD. In some instances, urea does not contain a fertilizer active. Alternatively, the core particles can be incorporated in a urea matrix that contains a fertilizer active such as DCD. In other cases, the urea matrix does not contain a fertilizer active.

Embodiments of the fertilizer particles disclosed herein can include a variety of different arrangements and proportions of the core particles and the urea-containing composition. In some embodiments, there are multiple core particles in a single fertilizer particle. In some embodiments, the diameter of the core particle is between about 0.5 and 2 mm. In some embodiments, the diameter of the core particle is about 0.1, 0.2, 0.3, 0.4, 0.5, 0.6, 0.7, 0.8. 0.9, 1.0, 1.1, 1.2, 1.3, 1.4, 1.5, 1.6, 1.7, 1.8, 1.9, 2.0, 3.0, 4.0, or 5.0 mm or is between any two of those values. In some embodiments, the thickness of the nitrogen fertilizer-containing composition is between about 1 and 6 mm. In some embodiments, the thickness of the nitrogen fertilizer-containing composition is about 0.1, 0.2, 0.3, 0.4, 0.5, 0.6, 0.7, 0.8. 0.9, 1.0, 1.1, 1.2, 1.3, 1.4, 1.5, 1.6, 1.7, 1.8, 1.9, 2.0, 3.0, 4.0, 5.0, 6.0, 7.0, or 8.0 mm or is between any two of those values. In some embodiments, the nitrogen fertilizer-containing composition is a solid and has been formed by spraying the nitrogen fertilizer-containing composition in molten form onto the core particle and allowing the molten nitrogen fertilizer-containing composition to cool and solidify. In some embodiments, the molten nitrogen fertilizer-containing composition is a molten urea-containing composition. In some embodiments, the weight ratio of the urea-containing composition to the core particle in the fertilizer particle is about 2:1, 5:1, 10:1, 15:1, 20:1, 30:1, 40:1, 50:1, 60:1, 70:1, 80:1, 90:1, or 100:1 or is between any two of those values. In some embodiments, the urea-containing composition makes up about 70, 80, 90, 95, or 99% of the weight of the fertilizer particle or between any two of those values. In some embodiments, the fertilizer particle has a diameter of between 0.5 and 8 mm. In some embodiments, the fertilizer particle has a diameter of about 0.2, 0.5, 1.0, 1.5, 2.0, 2.5, 3.0, 3.5, 4.0, 4.5, 5.0, 6.0, 7.0, 8.0, 9.0, or 10.0 mm or between any two of those values. In some embodiments, the core particle is an extruded particle.

Embodiments of the fertilizer particles disclosed herein can be characterized by the stability of the nitrogen in the particles when exposed to soils. Because of the efficient distribution of urease inhibitors and nitrification inhibitors in the particles, the fertilizer particles described herein suffer less loss of nitrogen due to hydrolysis and nitrification than would otherwise occur. In some embodiments, less than 20 wt % of the nitrogen in the fertilizer particle is lost via ammonia volatilization after being exposed to Greenville soil for 20 days. In some embodiments, the amount of nitrogen in the fertilizer particle lost via ammonia volatilization after being exposed to Greenville soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values. In some embodiments, less than 20 wt % of the nitrogen in the fertilizer particle is lost after being exposed to Crowley soil for 20 days. In some embodiments, the amount of nitrogen in the fertilizer particle lost after being exposed to Crowley soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values.

Embodiments of the fertilizer particles disclosed herein can also be characterized by the stability of the urease inhibitor, such as NBTPT, in the particles. This can be measured by a stability test that involves measuring the concentration of the urease inhibitor in the particles before and after being stored in controlled conditions for a certain amount of time. In some embodiments, the fertilizer particle has at least 90% of the urease inhibitor remaining after storing the particle at 22° C. for 30 days in a sealed container as compared to the concentration measured immediately before such storage takes place. In some embodiments, the fertilizer particle has at least about 85, 86, 87, 88, 89, 90, 91, 92, 93, 94, 95, 96, 97, 98, or 99% of the urease inhibitor remaining or has an amount remaining that is between any two of those values.

Also disclosed is a method of enhancing plant growth that can include applying to soil an effective amount of a composition comprising any of the fertilizer particles described herein.

Also disclosed is a method of making a fertilizer particle, the method can include: providing a core particle comprising NBTPT and a binder; providing a fertilizer composition comprising molten urea and DCD; and contacting the core particle with the fertilizer composition under conditions sufficient to form a solid fertilizer particle comprising the solidified fertilizer composition in contact with the outer surface of the core particle. In some embodiments, contacting the core particle with the fertilizer composition comprises spraying the fertilizer composition in molten form onto the core particle and allowing the fertilizer composition to cool and solidify. This can be accomplished using, for example, granulation apparatus known in the art. In some embodiments, the DCD is added on its own or in combination with other ingredients, directly to the molten urea before contacting the core particle with the molten urea composition. In some embodiments, the amount of the NBTPT in the core particle is about 0.1, 0.5, 1.0, 1.5, 2.0, 2.5, 3.0, 3.5, 4.0, 4.5, 5.0, 6.0, 7.0, 8.0, 9.0, 10.0, 11.0, 12.0, 13.0, 14.0, 15.0, 16.0, 17.0, 18.0, 19.0, or 20 wt % of the core particle or is between any two of those values. In some embodiments, the amount of the DCD in the fertilizer composition is about 0.1, 0.5, 1.0, 1.5, 2.0, 2.5, 3.0, 3.5, 4.0, 4.5, 5.0, 6.0, 7.0, 8.0, 9.0, 10.0, 11.0, 12.0, 13.0, 14.0, 15.0, 16.0, 17.0, 18.0, 19.0, 20.0, 25.0, 30.0, 35.0, 40.0, 45.0, or 50 wt % of the fertilizer composition or is between any two of those values. In some embodiments, the method of making a fertilizer particle can further include making the core particle by extruding a composition that includes a binder and NBTPT and, optionally, a filler, a pH buffering agent, and/or a polymer thickener. In some embodiments, the core particle is made by extruding a composition that can include between 35 and 55 wt % binder, between 0 and 45 wt % filler, 0 and 45 wt % pH buffering agent, between 0.1 and 1 wt % polymer thickener, and between 1 and 2.2 wt % NBTPT. In some other embodiments, the core particle is made by extruding a composition that can include between 35 and 55 wt % binder, between 35 and 50 wt % of an agent which is both a filler and a buffering agent, between 0.1 and 1 wt % polymer thickener, and between 1 and 2.2 wt % NBTPT. For example, many fillers known in the art can be used as buffering agents and vice versa. In some of these embodiments, $CaCO_3$ is used as both a filler and a pH buffering agent.

Also disclosed are the following Embodiments 1 to 20 of the present invention. Embodiment 1 is a fertilizer particle comprising: a core particle that includes a urease inhibitor and a binder; and a nitrogen fertilizer-containing composition in contact with the outer surface of the core particle and comprising a nitrification inhibitor. Embodiment 2 is the fertilizer particle of Embodiment 1, wherein the urease inhibitor comprises N-(n-butyl) thiophosphoric triamide (NBTPT) and the nitrification inhibitor comprises dicyandiamide (DCD). Embodiment 3 is the fertilizer particle of any one of Embodiments 1 to 2, wherein the binder comprises one or more of plaster of Paris, flour, biodegradable bleached wheat flour, starch, gluten, kaolin, bentonite, or colloidal silica. Embodiment 4 is the fertilizer particle of any one of Embodiments 1 to 3, wherein the binder is present in the core particle in an amount between 10 and 99 wt % of the core particle. Embodiment 5 is the fertilizer particle of any one of Embodiments 1 to 4, wherein the core particle further comprises a filler in an amount between greater than 0 and 60 wt % of the core particle, wherein the filler comprises one or more of silica, dried distillers grains with solubles (DDGS), $CaCO_3$, chalk powder, or rice husk. Embodiment 6 is the fertilizer particle of any one of Embodiments 1 to 5, wherein the core particle further comprises a pH buffering agent in an amount between 5 and 60 wt % of the core particle, wherein the pH buffering agent comprises one or more of chalk powder, $CaCO_3$, MgO, KH$_2$PO$_4$, NaHCO$_3$, Na$_2$CO$_3$, K$_2$CO$_3$, or MgCO$_3$. Embodiment 7 is the fertilizer particle of any one of Embodiments 1 to 6, wherein the core particle further comprises a polymer thickener in an amount between 0.1 and 1 wt % of the core particle, wherein the polymer thickener comprises hydroxypropyl methylcellulose (HPMC), carboxymethyl cellulose, polyethylene glycol (PEG), guar gum, locust bean gum, xanthan gum, a natural gum, or hydroxyethyl cellulose. Embodiment 8 is the fertilizer particle of any one of Embodiments 1 to 7, wherein the amount of the urease inhibitor in the core particle is between 1 and 5 wt % of the core particle and the amount of the nitrification inhibitor in the nitrogen fertilizer-containing composition is between 0.5 and 2 wt % of the nitrogen fertilizer-containing composition. Embodiment 9 is the fertilizer particle of any one of Embodiments 1 to 8, wherein the amount of the urease inhibitor in the nitrogen fertilizer-containing composition is no more than 0.01 wt % of the nitrogen fertilizer-containing composition and the amount of nitrification inhibitor in the core particle is no more than 0.01 wt % of the core particle. Embodiment 10 is the fertilizer particle of any one of Embodiments 1 to 9, wherein the nitrogen fertilizer-containing composition substantially surrounds the core particle or fully surrounds the core particle. Embodiment 11 is the fertilizer particle of any one of Embodiments 1 to 10, wherein the diameter of the core particle is between 0.5 and 2 mm and the thickness of the nitrogen fertilizer-containing composition is between 1 and 6 mm. Embodiment 12 is the fertilizer particle of any one of Embodiments 1 to 11, wherein the core particle is an extruded particle. Embodiment 13 is the fertilizer particle of any one of Embodiments 1 to 12, wherein the nitrogen fertilizer-containing composition comprises urea. Embodiment 14 is the fertilizer particle of any one of Embodiments 1 to 13, wherein the fertilizer particle has at least 90% of the urease inhibitor remaining after being stored at 22° C. for 30 days in a sealed container. Embodiment 15 is the fertilizer particle of any one of Embodiments 1 to 14, comprising 1-5 wt % binder, 1-5 wt % filler, 1-5 wt % pH buffering agent, 0.01-0.1 wt % polymer thickener, 0.05-0.2 wt % urease inhibitor, 90-95 wt % nitrogen fertilizer, and 0.5-2 wt % nitrification inhibitor. Embodiment 16 is a fertilizer composition comprising: the fertilizer particle of any one of Embodiments 1 to 15, and another fertilizer particle comprising a core and a shell, wherein the core comprises urea, at least one of a urease inhibitor or nitrification inhibitor, and at least one of a binder, a filler, a pH buffering agent, or a polymer thickener, and wherein the shell comprises urea and a nitrification inhibitor. Embodiment 17 is a fertilizer particle comprising: (a) a core particle that includes NBTPT and a binder; and (b) a shell comprising a solid urea composition comprising DCD. Embodiment 18 is a method of making a fertilizer particle, the method comprising: providing a core particle comprising NBTPT and a binder; providing a fertilizer composition comprising molten urea and DCD; and contacting the core particle with the fertilizer composition under conditions sufficient to form a solid fertilizer particle comprising the solidified fertilizer composition in contact with the outer surface of the core particle. Embodiment 19 is the method of Embodiment 18, wherein contacting the core particle with the fertilizer composition comprises spraying the fertilizer composition onto the core particle. Embodiment 20 is the method of any one of Embodiments 18 to 19, wherein the core particle is made by extruding a composition comprising between 35 and 55 wt % binder, between 35 and 50 wt % of an agent which is both a filler and a pH buffering agent, between 0.1 and 1 wt % polymer thickener, and between 1 and 2.2 wt % NBTPT.

The term "fertilizer particle" as used herein refers to a discrete particle that includes both a core particle and a solid composition in contact with the outer surface of the core particle and covering at least a portion of the surface of the core particle. A "fertilizer particle" may also be referred to as a granule, fertilizer granule, prill, or fertilizer prill.

The terms "about" or "approximately" as used herein are defined as being close to as understood by one of ordinary skill in the art. In one non-limiting embodiment, the terms are defined to be within 10%, preferably within 5%, more preferably within 1%, and most preferably within 0.5%.

The terms "wt %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The fertilizer compositions of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the fertilizer particles compositions of the present invention are their abilities to inhibit degradation for the heat sensitive component(s) included in the particle core.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

DETAILED DESCRIPTION OF THE INVENTION

The fertilizer particles described herein contain two discrete portions: a core particle and a nitrogen fertilizer-containing composition in contact with the core particle. The particles contain urease inhibitors and nitrification inhibitors kept separate by virtue of being located in the two discrete portions of the particle. For example, in some embodiments, the urease inhibitor NBTPT is located exclusively in the core particle and the nitrification inhibitor is located exclusively in the nitrogen fertilizer-containing composition, which is also referred to in some embodiments as the "shell" portion of the fertilizer particle. These and other non-limiting aspects of the present invention are discussed in further detail in the following sections.

A. Fertilizer Particle

Figure 1:
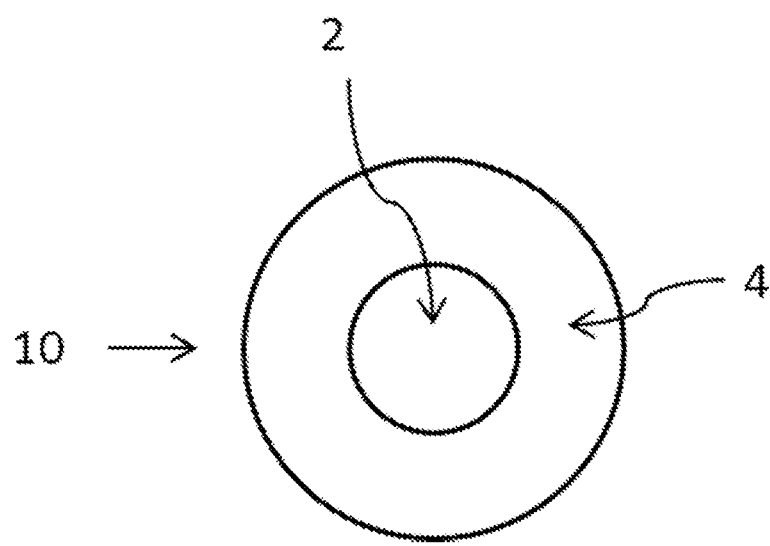
FIG. 1 illustrates a cross section of a fertilizer particle embodiment.

An illustrative cross section view of an embodiment of a fertilizer particle is depicted in FIG. 1. In the illustrated embodiment, the fertilizer particle 10 can include a core particle 2 and a shell 4. The core particle 2 has a circular cross-section, although other shapes can readily be made. The core particle 2 can include the urease inhibitor NBTPT and at least a binder. The core particle 2 may also include a filler, a pH balancing agent, and/or a polymer thickener. In the illustrated embodiment, a shell 4 surrounding the core particle 2 is made from a solid urea-containing composition that includes the nitrification inhibitor DCD. In the illustrated embodiment, the NBTPT and DCD are kept separate within the fertilizer particle 10 by being disposed in different regions of the particle: the NBTPT in the core particle and the DCD in the shell.

It will be apparent to persons of ordinary skill in the art that other configurations of the fertilizer particle 10 are possible. For example, the core particle 2 can contain a nitrification inhibitor, with the shell 4 containing a urease inhibitor. Or the core particle 2 can be made from the urea-containing composition with added inhibitor, with the shell 4 being comprised of a binder, filler, and inhibitor. In some embodiments, it is preferred to have the DCD in the urea-containing shell 4 because DCD can be added to molten urea during the manufacturing process without causing substantial degradation of the DCD, whereas NBTPT is sensitive to degradation under the same conditions. By having the NBTPT disposed within the core particle 2, it is protected from heat degradation during the manufacturing process.

While the fertilizer particle 10 illustrated in FIG. 1 has a circular cross-section, a variety of shapes are possible. For example, the fertilizer particle can have a spherical, puck, oval, or oblong shape. The fertilizer particles can also have a variety of sizes. In some embodiments, the fertilizer particle has a longest dimension between about 1 and 8 mm.

Binders to be used in the fertilizer particle may be chosen for their suitability to extrusion processes for making core particles. In some instances, the binders are receptive to a solvent, such as, for example, water. "Receptive to solvents" in this context means that the solvents will affect the binding properties of the binder. Accordingly, as described herein, an appropriate solvent will affect the binding properties of a particular binder, as well as other binders, fillers, and excipients in the formulation.

Core particles and fertilizer particles disclosed herein have desirable physical properties such as desired levels of abrasion resistance, particle strength, pelletizability, hygroscopicity, particle shape, and size distribution, which are important properties for the fertilizer core particle. Accordingly, the binder may be chosen to optimize these properties.

A particular application of embodiments disclosed herein is the stabilization of an inhibitor, such as, for example, NBTPT present in the core particle and of other fertilizer additives. Certain fertilizer additives are unstable and tend to degrade upon exposure to high temperatures, changes in pH (either acidic or basic), etc. In particular instances, fertilizer core particles disclosed herein are embedded within or coated with a fertilizer composition such as, for example, urea. In some instances, a shell that includes urea substantially surrounds at least a portion of the outer surface of the core particle.

In conventional fertilizer technology, various fertilizer additives are mixed with a fertilizer using an "all in one" methodology. In these instances, fertilizers, fertilizer additives, excipients, and other ingredients are mixed together to form a fertilizer composition in the form of particles or granules. In most cases, granulation is performed at elevated temperatures such that the fertilizer composition is at a molten state. For example, the granulation temperature for molten urea is about 135° C. at about 35 atm pressure. Many fertilizer additives degrade, at least partially, under these conditions. Traditionally, these stability problems have been circumvented by using a large excess of fertilizer additives. Such methods, although in use, are sub-optimal and raise concerns regarding cost, efficacy, by-products, environmental waste, and green-house gases, etc.

The production of core particles disclosed herein provides a solution to the instability of fertilizer additives at higher temperatures. The binder, pH stabilizing agent and/or filler can be chosen such that the resulting composition synergistically protects the fertilizer additives from high temperature degradation. As disclosed herein, the binder, pH stabilizing agent, filler, and polymer thickener can be mixed together with the fertilizer additive and extruded to form a core particle.

In some embodiments, no nitrogen fertilizer composition is present in the core particle. Thus, in such instances, only the fertilizer additive, such as a urease inhibitor or nitrification inhibitor (together with the binder, pH buffering agent, and/or filler) is present in within the core particle.

Some of the fertilizer additives are unstable towards changes in pH, either in the composition during the manufacturing process, or after application to the soil. For example, in the case of nitrogen containing fertilizers, after application, the soil environment becomes acidic. Accordingly, fertilizer additives that are sensitive to the acidic pH degrade and will not reach their full performance capability. Including a large excess of fertilizer additives to compensate for the loss due to pH variations may not be successful, since the fertilizers, which are present in a large excess (in comparison to the fertilizer additives), continue to alter the pH of the soil environment. Also, some commercial products, such as SuperU®, use organic solvents like NMP for adding fertilizer additives to the fertilizer composition. Such use is undesired and is avoided in the production of certain embodiments of the fertilizer particles described herein.

In some embodiments disclosed herein, the core particle is embedded within a nitrogen fertilizer-containing composition, including a urea-containing composition. For example, in some embodiments, a shell containing a fertilizer composition at least partially surrounds the outer surface of the fertilizer core particle. In some of these embodiments, the shell comprises a nitrogen containing fertilizer composition, such as urea. In some instances, two or more core particles can be embedded within a urea matrix.

B. Urease Inhibitors and Nitrification Inhibitors

Urea is one of the most widely used fertilizers because of its high nitrogen content (46.6%). A number of urease and nitrification inhibitors have been developed to enhance the efficiency of urea fertilizer, but their application can be challenging due to stability problems in the soil under various conditions such as pH, temperature, precipitation, etc. For example, NBTPT is known to be a good inhibitor of urease but it is unstable under acidic pH. NBTPT also decomposes when exposed to high temperatures, such as the temperature of a urea melt (about 135-140° C.).

To overcome these issues, embodiments of the fertilizer particle are provided that contain a core particle that is coated with an outer coating of urea that will first come in contact with the soil, protecting the active ingredients in the core particle, which will get released gradually. The fertilizer core particle may contain both a binder and a pH buffering agent. The pH buffering agent, for example $CaCO_3$, which may be provided in the form of chalk powder, is a material that can neutralize the acidity caused by urea hydrolysis, thereby preventing active agents, such as, for example, NBTPT, from degrading when placed in soil with an acidic pH. Thus, the pH buffering agent can increase the efficacy of active agents, such as, for example, NBTPT, and also maintains soil pH. The fertilizer particles also have the advantage of keeping a urease inhibitor and a nitrification inhibitor in separate areas of the fertilizer particle, which prevents any degradation or other detrimental effects from combining different inhibitors.

The binder in the fertilizer core particle protects the active ingredient, for example NBTPT, from being exposed to high temperatures during the granulation process, thereby preventing NBTPT from decomposing in the granulation process. For example, plaster of Paris (PoP)-containing cores can prevent NBTPT degradation efficiently during the granulation process. In such a formulation, all active ingredients are protected inside the core by the PoP.

Additional inhibitors besides NBTPT and DCD may be included in the fertilizer particles described herein, including without limitation, 3,4-dimethylpyrazole phosphate (DMPP), thio-urea (TU), phenyl phosphorodiamidate (PPDA), 2-chloro-6-(trichloromethyl)-pyridine (Nitrapyrin), 5-ethoxy-3-trichloromethyl-1, 2, 4-thiadiazol (Terrazole), 2-amino-4-chloro-6-methyl-pyrimidine (AM), 2-mercapto-benzothiazole (MBT), or 2-sulfanimalamidothiazole (ST), or combinations thereof.

Additional fertilizer substances besides urea may be included in the fertilizer particles. Additional fertilizers can be chosen based on the particular needs of certain types of soil, climate, or other growing conditions to maximize the efficacy of the fertilizer particle in enhancing plant growth and crop yield. Additional additives may also be included in the fertilizer particles, including without limitation micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients may include lime, gypsum, superphosphate, or a combination thereof.

C. Binders

The fertilizer particles described herein may contain a binder, which is a material that is used to bind together components in a mixture through adhesive and/or cohesive forces. The core particle can include from 10 to 99 wt % of binder. The amount and type of binder can be chosen based on the desired final properties of the core particle. The binder may be selected so that an extrusion process can be used during the production of the core particle. It is understood that for some binders, such as Plaster of Paris and bleached wheat flour, an amount of water (moisture) is needed to make the core extrudable. Any free moisture content present in the core material during the extrusion process is typically removed post-extrusion. However, residual amounts of free moisture content, typically below 4 wt %, such as, for example, below 0.5 wt %, can be present in the core particle.

In one aspect, the binder can include a phosphate, a polyphosphate, a biodegradable polymer, or a wax, or a combination thereof. Suitable waxes include, but are not limited to, vegetable waxes, high melt waxes, ethylene bis(stearamide) wax, paraffin waxes, polyethylene based waxes, and olefin waxes. Suitable phosphates include, but are not limited to, diammonium phosphate, and monoammonium phosphate. Suitable polyphosphates include, but are not limited to, ammonium polyphosphate. Suitable biodegradable polymers include, but are not limited to, polyacrylamide, polyacrylic acid, polyacrylonitrile, biodegradable polylactic acid and other biodegradable polymeric material such as polylactic acid, poly(3-hydroxypropionic acid), polyvinyl alcohol, poly e-caprolactone, poly L-lactide, poly butylene succinate, and biodegradable starch based polymers.

In another aspect, the binder can include plaster of Paris, flour, starch, gluten, kaolin, bentonite, colloidal silica, or combinations thereof. Suitable flours include, but are not limited to, rice flour, wheat flour, and bleached wheat flour. Suitable starches include, but are not limited to, dextrin modified starches.

D. pH Buffering Agents

The core particle can include one or more pH buffering agents to help counteract the tendency of urea fertilizer to acidify the soil. Examples of suitable pH buffering agents include, but are not limited to, $CaCO_3$, MgO, $KH_2PO_4$, $NaHCO_3$, chalk powder, aluminum, magnesium hydroxide, aluminum hydroxide/magnesium hydroxide co-precipitate, aluminum hydroxide/sodium bicarbonate co-precipitate, calcium acetate, calcium bicarbonate, calcium borate, calcium carbonate, calcium bicarbonate, calcium citrate, calcium gluconate, calcium hydroxide, dibasic sodium phosphate, dipotassium hydrogen phosphate, dipotassium phosphate, disodium hydrogen phosphate, magnesium acetate, magnesium borate, magnesium bicarbonate, magnesium carbonate, magnesium hydroxide, magnesium lactate, magnesium oxide, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium tartrate, sodium tripolyphosphate, synthetic hydrotalcite, tetrapotassium pyrophosphate, tetrasodium pyrophosphate, tripotassium phosphate, trisodium phosphate, and trometamol, and combinations thereof.

E. Fillers

The core particles in the fertilizer particles can include a filler, which is a material that can improve the physical properties of the core particle, such as crush strength, homogeneity, and extrusion properties, or alter the release kinetics of inhibitors or micronutrients from the core particle. A filler in combination with a binder can be selected to enhance physical and release properties of the core particle. The filler can comprise, for example, silica, dried distillers grains with solubles (DDGS), rice husk or other biomaterial, or a combination thereof.

F. Nitrogen Fertilizer-Containing Composition

In one aspect, the fertilizer particle can include an outer layer, or shell, comprising a nitrogen fertilizer, such as urea or a combination of urea with other nitrogen fertilizers. Suitable other nitrogen fertilizers include, but are not limited to, ammonium nitrate, ammonium sulfate, DAP, MAP, urea-formaldehyde, ammonium chloride, and potassium nitrate. A urea-containing shell can be fattened onto the core particle by spraying molten urea onto the core particle in a granulation process.

G. Compositions

The fertilizer particles described herein can be included in a composition useful for application to soil. In addition to the fertilizer particles, the composition may include other fertilizer compounds, micronutrients, primary nutrients, secondary nutrients, insecticides, herbicides, fungicides, and combinations thereof.

The fertilizer particles described herein can also be included in a blended composition that can include other fertilizer granules. The other fertilizer granules can be granules of urea, single super phosphate (SSP), triple super phosphate (TSP), ammonium sulfate and the like. The other fertilizer granules, in some instances, include a core. In those instances, the core can include urea, a urease inhibitor, a nitrification inhibitor and at least one of a binder, a filler, a pH buffering agent and/or a polymer thickener. A shell can include fertilizers, and/or fertilizer actives placed around these cores. In some instances, the fertilizer can be urea, and the fertilizer active can be at least one of urease or a nitrification inhibitor. In some of these embodiments, the shell includes urea and a nitrification inhibitor. In some of the other embodiments, the shell includes urea and a urease inhibitor.

H. Method of Making a Fertilizer Particle

In some embodiments, the core particle is made by extruding a composition that includes a urease inhibitor, a binder, and, optionally, other suitable substances such as fillers, pH balancing agents, or other additives. The composition can be formed by mixing the ingredients in dry form, adding any solvent, if needed, and further mixing to make an extrudable composition. A solvent, such as water, may be needed to make an extrudable composition if the binder is plaster of Paris, flour, starch, or gluten, but may not be needed if the binder can include a wax. The extrusion can be done using suitable extruder apparatus known in the art and can be performed at a temperature between 0° C. and 150° C. and a screw speed from 1 to 500 rpm, wherein the extruder includes a multi-feeder that can include extrusion components including a main drive, shaft, screw, barrel, and/or die. In some embodiments, the binder includes plaster of Paris, and the extrusion is performed at a temperature between about 15° C. and 50° C. In some embodiments, the extrusion method can include slicing the extrudate, forming a core particle having a cylindrical shape and having both a diameter and a length between about 0.5 and 2.0 mm. The method may also include a drying step to remove solvent that may have been added to make the composition extrudable. The cylindrical core particle may be spheronized, producing a core particle having a substantially spherical shape.

The core particle can be fattened with a shell that can include a urea-containing composition, thereby forming a fertilizer particle. The fattening process can include spraying a molten urea-containing composition onto the core particle, for example, in a granulation apparatus known in the art. As the molten urea-containing composition is sprayed onto the core particle, it cools and solidifies, resulting in a fertilizer particle. The resulting fertilizer particle can be of various sizes. In some embodiments, the fertilizer particle has a size between about 1 and 8 mm.

Figure 2:
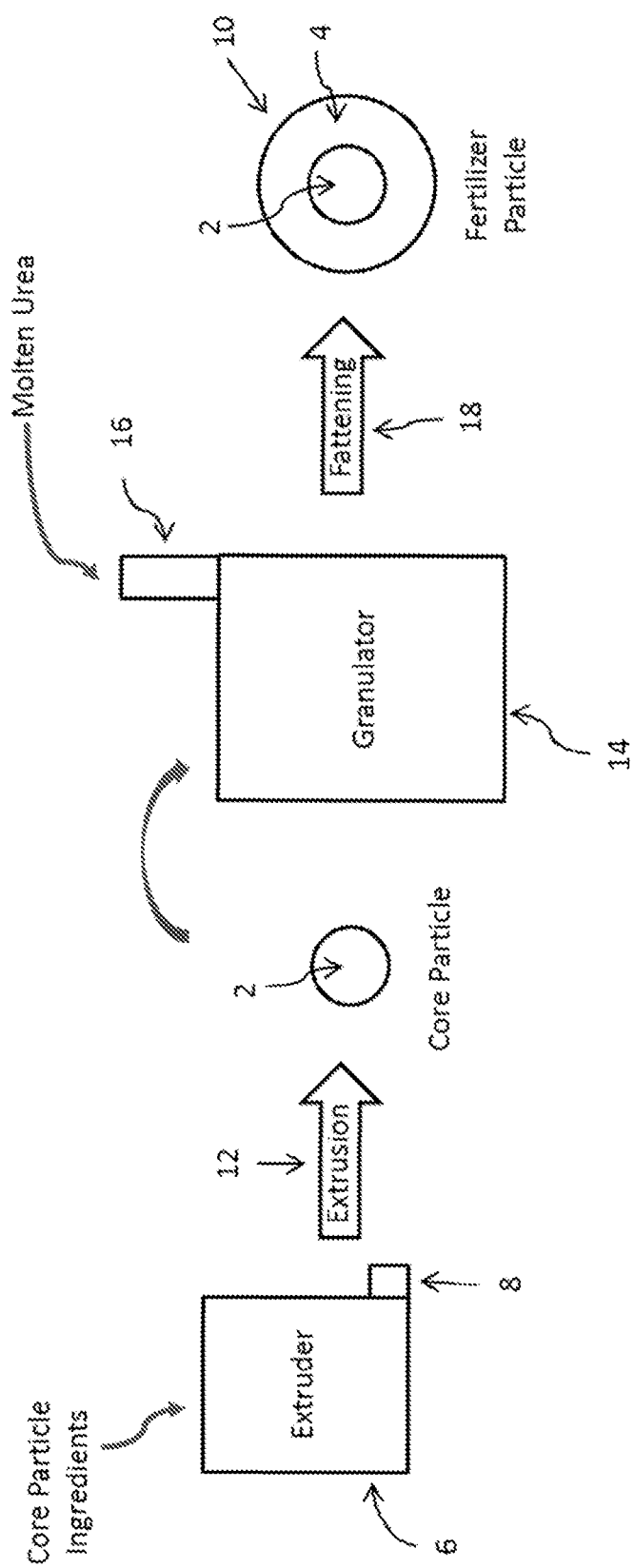
FIG. 2 depicts an embodiment of a process by which a fertilizer particle is produced.

FIG. 2 illustrates an embodiment of a process by which a fertilizer particle 10 can be produced. To make the core particle 2, the core particle ingredients, which can include a binder, filler, pH balancing agent, polymer thickener, and NBTPT, among other suitable ingredients, are placed into the hopper of an extruder 6. The extruder 6 pushes the mixed core particle ingredients through a die 8 in the process of extrusion 12. During extrusion 12, a cutting implement (not shown) associated with the die 8 cuts the extrudate into pieces, resulting in core particles 2 (not drawn to scale), which may be further processed (not shown) to be dried, if needed, and made spherical. The core particles are then added to a granulator 14. Molten urea, which may also include DCD, is delivered into the granulator apparatus through a pipe 16. Within the granulator 14, the molten urea is sprayed onto the surface of the core particles 2, where it cools and solidifies in a process known as fattening 18. After fattening 18, the fertilizer particle 10 has both a core particle 2 and a solid urea-containing shell.

After the final processing, a majority of the fertilizer particles 10 is within the specification. However, some fertilizer particles are either over-sized or under-sized. These off-specification particles are separated, crushed, and the powdered material is re-directed to the granulator apparatus. The recycled, powdered material are granulated, and molten urea is sprayed onto the surface of the granulated material. In some embodiments, the granules that include recycled composition can be blended with the fertilizer particles 10. These compositions can include between 20 wt % and 50 wt % of the granules containing the recycled composition.

I. Methods of Using Fertilizer Particles

The fertilizer particles described herein can be used in methods of increasing the amount of nitrogen in soil and of enhancing plant growth. Such methods can include applying to the soil an effective amount of a composition that includes the fertilizer particles. The method may include increasing the growth and yield of crops such as, for example, rice, wheat, corn, barley, oats, and soybeans.

The effectiveness of compositions that include the fertilizer particles described herein can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions. Compositions that include the fertilizer particles described herein can be compared directly to such fertilizers as Agrotain® or SuperU®. Agrotain® is sold by Koch Fertilizer, LLC (USA) and is an NBTPT-containing liquid formulation, with NMP as the main solvent along with other additives to allow for spreading of this liquid onto urea granules, generally at the farm site. Thus, it requires an additional step before being used by the farmer and incorporates the toxic solvent NMP. Tremendous odor is evident during usage. SuperU® is sold by Koch Fertilizer, LLC and is a formulation of urea containing both NBTPT and DCD prepared by adding these two inhibitors to the urea melt during granulation.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Methods of Making Fertilizer Particles

A. Materials

Technical grade urea was obtained from SABIC®, (Kingdom of Saudi Arabia). Plaster of Paris, chalk powder and bleached wheat flour were obtained from Bengaluru, India local markets. Hydroxypropylmethyl cellulose (HPMC) was bought from Loba Chemie Pvt. Ltd. (India) N-(n-butyl) thiophosphoric triamide (NBTPT) was purchased from Samich (HK) Ltd., (Hangzhou, China).

B. Procedure for Extruding Core Particles

Representative procedure for lab scale extruder: The raw materials needed for formulations were weighed to the nearest accuracy and mixed thoroughly. The compounding operations were carried out in a W &P ZSK25 Twin Screw Extruder with a 25 mm screw diameter on a 6-barrel. The screw configuration was designed with sufficient kneading elements to get maximum shear for better mixing. The experiments were carried out at a processing temperature ranging from 5° C. to 50° C. The temperature of the extrusion process was controlled by the screw speed used in the extrusion process. The temperature of the extrusion process for fertilizer core particles comprising plaster of Paris was between 20° C. and 50° C. The ingredients were added through the hopper slowly by keeping the load constant. The extrudates were collected as strands and dried at room temperature. Screw speed was between 20-100 rpm and the material was added through the main hopper at 6-8 kg/hr. The extrudates were collected out of the die at the end of the extruder in a tray and allowed to cool.

C. Procedure for Coating Core Particles and Granulation

The extruded core particles were provided as described above. Core particles having a longest dimension of 0.7-1.2 mm were chosen for granulation. During the granulation process, active ingredients, such as the inhibitors, were protected inside the core particles by the binder materials used in the formulation. The core particles were placed in the granulator. The core particles were sprayed with a urea melt, which may contain a nitrification inhibitor, inside the granulator to produce the fertilizer particle. The granulated fertilizer core (fertilizer particles) generally have a longest dimension of about 4 mm. The granulating process both fattened the cores with urea and dried the fertilizer granules.

The spray rate of the urea melt was controlled to control the agglomeration of multiple cores into one fertilizer granule. Round, single, and multi-core fertilizer granules were produced using this process.

The granulation process parameters that were used are described in Table 1.

TABLE 1

| Process | Coating |
|---|---|
| Bin | Coating Bin |
| Nozzle | Bottom spray; Diameter 1.2 mm, Air cap 2.6 mm |
| Atomization air pressure | 0.8 bar |
| Distribution plate | Sieve plate with 58% free area |
| Sieve cloth | 1x; 25 μm mesh size |
| Nozzle heating (thermal oil temperature) | 160° C. |
| Liquid tank heating (thermal oil temperature) | 150° C. |
| Atomization air heating | 100° C. |
| Electrical trace heating (tube) | 160° C. |
| Valve I heating (in front of the nozzle) | 160° C. |
| Valve II heating (liquid tank discharge) | 160° C. |

Example 2

Prophetic Example Sample Analysis and Applications

Properties of the fertilizer particles made according to Example 1 will be tested. The purity of NBTPT and DCD can be cross-checked by NMR, HPLC, and LCMS analysis. Crush strength can be measured for some of the samples using a crush strength analyzer to determine the strength of the extrudates fertilizer particles. The stability of inhibitors in the urea melt, core particles, and/or fertilizer particles can be measured using HPLC and LCMS. The free and total moisture content of extrudates can be measured using a moisture analyzer.

It is expected that the final fertilizer particles will have the following properties: crush strength (kgf): 1.68-3.60; abrasion analysis (wt loss %): 0.11-0.85; impact resistance (shattered granules %): 0.05-0.64; moisture analysis (wt %): 0.12-0.23; particle size distribution (granule): 2-4 mm (97%); Biuret %: 1.05-3.8; and Nitrogen %: 43.3-46.3.

The nitrogen volatilization and nitrogen transformation (nitrification) will be measured in different soils and compared to urea alone and to products on the market such as Agrotain®, ESN®, and SuperU®. A soil that is representative of a broader class of soil types can be used to measure the nitrogen volatilization and nitrification. Greenville soil and Crowley soil are two such representative soils. Other soils may also be used for the experiments described herein.

Greenville soil or Greenville clay-loam soil is typical of weathered tropical ultisols and is found in warm humid environments. The soil is classified as fine, kaolinitic, thermic Rhodic Kandiudults with a pH of 6.1-6. The soil has organic matter of 1.4%, total amount of nitrogen is about 0.06%, and the CEC is 5.2 cmol/kg. Accordingly, the soil has a low content of organic matter, and also low availability of sulfur and nitrogen. Thus, the soil is ideal for nitrogen and sulfur trials with fertilizers.

Crowley soil consists of very deep, somewhat poorly drained, very slowly permeable soils that formed in clayey fluviomarine deposits of the Pleistocene age. The soil exists in nearly level to very gently sloping soils and occurs on flat coastal plains terraces. The slope is dominantly less than 1 percent but ranges to up to 3 percent. The mean annual precipitation is about 1549 mm (61 in.), and the mean annual air temperature is about 20 degrees C. (68 degrees F.), where the soil is found. The soil is fine, smectitic, and thermic Typic Albaqualfs.

The nitrogen volatilization of various exemplary samples of fertilizer granules as compared to Agrotain®, ESN®, SuperU®, and urea will be determined as the percentage of nitrogen loss via ammonia volatilization as compared to the amount of nitrogen applied or as the absolute mass of nitrogen lost via ammonia volatilization. It is expected that embodiments of the fertilizer particles disclosed herein will lose less than 20 wt % of the applied nitrogen after being exposed to soil for 20 days. It is also expected that embodiments of the fertilizer particles disclosed herein will lose less than 20 wt % of the applied nitrogen after being exposed to Greenville soil for 20 days and less than 20 wt % of the applied nitrogen after being exposed to Crowley soil for 20 days. It is also expected that embodiments of the fertilizer particles disclosed herein will have lower levels of ammonia volatilization and/or nitrogen loss than Agrotain®, ESN®, and/or SuperU® tested under substantially identical conditions in a given soil, which may include Greenville soil, Crowley soil, or other soils.

Example 3

Stability of NBTPT in Fertilizer Particles

Figure 3:
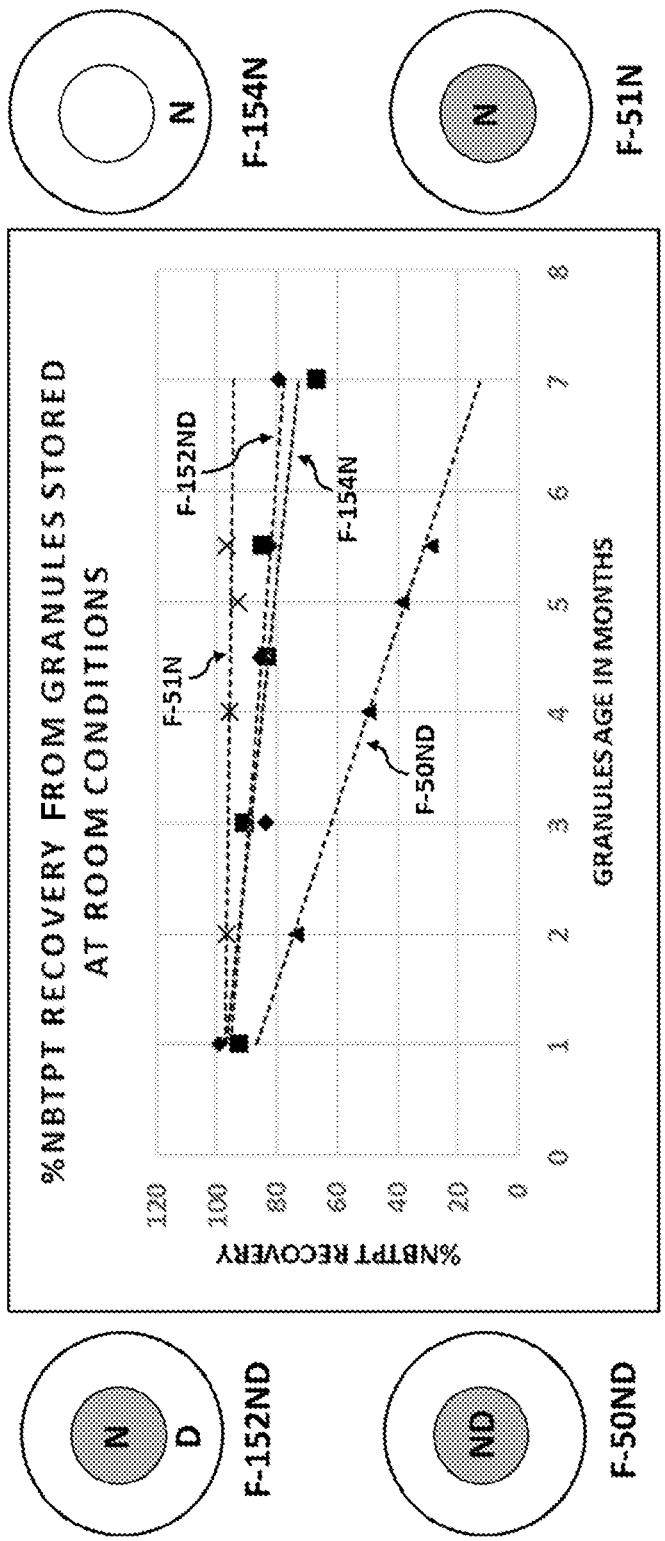
FIG. 3 shows results of an experiment comparing the stability of NBTPT in four different fertilizer particle configurations: (1) particles that include NBTPT ("N") in the core (F-51N); (2) particles that include NBTPT in the core and DCD ("D") in the shell (F-152ND); (3) particles that include NBTPT in the shell (F-154N); and (4) particles that include both NBTPT and DCD in the core (F-50ND).

Four different fertilizer particle types were prepared according to the method of Example 1. The different types of particles are illustrated in FIG. 3—"N" stands for NBTPT and "D" stands for DCD. The F-51N particles had NBTPT in the core particle and no DCD in the shell. The F-152ND particles had NBTPT in the core and DCD in the shell. The F-154N particles had no inhibitor in the core and NBTPT in the shell (NBTPT was added to the urea melt before granulation). The F-50 ND particles had both NBTPT and DCD in the core.

The particles were prepared and then stored under the same conditions (approximately 22° C. and 60% relative humidity) in polyethylene bags. NBTPT amounts in the granules were measured periodically by crushing granules, dissolving the resulting powder in 95% by volume of acetonitrile in water, filtering through a 0.45 µm filter, and analyzing the filtrate by HPLC with Photodiode Array detector (Shimadzu, Japan). The column used was a Phenomenex Luna 5 µm Phenyl hexyl 250×4.6 mm column with a mobile phase of acetonitrile:water (50:50, v/v). The analysis was performed with a flow rate of 1 mL/min at room temperature, with a 15 minute run time. All the samples were analyzed at a 207 nm wavelength. The NBTPT quantification was carried out by integration of the peak using standard calibration samples in triplicate.

FIG. 3 shows that the stability of NBTPT was highest for the F-51N particles, in which the NBTPT was protected against thermal degradation during granulation by being in the core particle. The F-154N particles, with NBTPT in the shell had reduced stability, which may be a result of the thermal degradation caused by adding the NBTPT directly to the urea melt rather than having it protected in the core particle. The lowest stability for NBTPT was obtained when NBTPT and DCD were present together in the core particle. Thus, even though the NBTPT was protected from thermal degradation during granulation by being in a core particle, the presence of DCD in the core particle may cause stability problems. The F-152ND particles, with NBTPT in the core particle separated from the DCD in the shell had higher stability, with approximately 90% of NBTPT remaining after 3 months.

The invention claimed is:

1. A fertilizer particle comprising:
   a core particle that includes a urease inhibitor and a binder; and
   a shell comprising a nitrogen fertilizer-containing composition and a nitrification inhibitor, the shell being in contact with the outer surface of the core particle and at least partially surrounding the outer surface.

2. The fertilizer particle of claim 1, wherein the urease inhibitor comprises N-(n-butyl) thiophosphoric triamide (NBTPT) and the nitrification inhibitor comprises dicyandiamide (DCD).

3. The fertilizer particle of claim 1, wherein the binder comprises one or more of Plaster of Paris, flour, biodegradable bleached wheat flour, starch, gluten, kaolin, bentonite, or colloidal silica.

4. The fertilizer particle of claim 1, wherein the binder is present in the core particle in an amount between 10 and 99 wt % of the core particle.

5. The fertilizer particle of claim 1, wherein the core particle further comprises a filler in an amount between greater than 0 and 60 wt % of the core particle, wherein the filler comprises one or more of silica, dried distillers grains with solubles (DDGS), $CaCO_3$, chalk powder, or rice husk.

6. The fertilizer particle of claim 1, wherein the core particle further comprises a pH buffering agent in an amount between 5 and 60 wt % of the core particle, wherein the pH buffering agent comprises one or more of chalk powder, $CaCO_3$, MgO, $KH_2PO_4$, $NaHCO_3$, $Na_2CO_3$, $K_2CO_3$, or $MgCO_3$.

7. The fertilizer particle of claim 1, wherein the core particle further comprises a polymer thickener in an amount between 0.1 and 1 wt % of the core particle, wherein the polymer thickener comprises hydroxypropyl methylcellulose (HPMC), carboxymethyl cellulose, polyethylene glycol (PEG), guar gum, locust bean gum, xanthan gum, a natural gum, or hydroxyethyl cellulose.

8. The fertilizer particle of claim 1, wherein the amount of the urease inhibitor in the core particle is between 1 and 5 wt % of the core particle and the amount of the nitrification inhibitor in the nitrogen fertilizer-containing composition is between 0.5 and 2 wt % of the nitrogen fertilizer-containing composition.

9. The fertilizer particle of claim 1, wherein the amount of the urease inhibitor in the nitrogen fertilizer-containing composition is no more than 0.01 wt % of the nitrogen fertilizer-containing composition and the amount of nitrification inhibitor in the core particle is no more than 0.01 wt % of the core particle.

10. The fertilizer particle of claim 1, wherein the nitrogen fertilizer-containing composition substantially surrounds the core particle or fully surrounds the core particle.

11. The fertilizer particle of claim 1, wherein the diameter of the core particle is between 0.5 and 2 mm and the thickness of the nitrogen fertilizer-containing composition is between 1 and 6 mm.

12. The fertilizer particle of claim 1, wherein the core particle is an extruded particle.

13. The fertilizer particle of claim 1, wherein the nitrogen fertilizer-containing composition comprises urea.

14. The fertilizer particle of claim 1, wherein the fertilizer particle is configured to retain at least 90% of the urease inhibitor remaining after being stored at 22° C. for 30 days in a sealed container.

15. The fertilizer particle of claim 1, comprising 1-5 wt % binder, 1-5 wt % filler, 1-5 wt % pH buffering agent, 0.01-0.1 wt % polymer thickener, 0.05-0.2 wt % urease inhibitor, 90-95 wt % nitrogen fertilizer, and 0.5-2 wt % nitrification inhibitor.

16. A fertilizer composition comprising:
 the fertilizer particle of claim 1, and
 another fertilizer particle comprising a core and a shell, wherein the core comprises urea, at least one of a urease inhibitor or nitrification inhibitor, and at least one of a binder, a filler, a pH buffering agent, or a polymer thickener, and wherein the shell comprises urea and a nitrification inhibitor.

17. A fertilizer particle comprising:
 (a) a core particle that includes N-(n-butyl) thiophosphoric triamide (NBTPT) and a binder; and
 (b) a shell comprising a solid urea composition and dicyandiamide (DCD).

18. A method of making a fertilizer particle, the method comprising:
 providing a core particle comprising N-(n-butyl) thiophosphoric triamide (NBTPT) and a binder;
 providing a fertilizer composition comprising molten urea and dicyandiamide (DCD); and
 contacting the core particle with the fertilizer composition under conditions sufficient to solidify the fertilizer composition on an outer surface of the core particle to form a solid fertilizer particle comprising the solidified fertilizer composition in contact with the outer surface of the core particle.

19. The method of claim 18, wherein contacting the core particle with the fertilizer composition comprises spraying the fertilizer composition onto the core particle.

20. The method of claim 18, wherein the core particle is made by extruding a composition comprising between 35 and 55 wt % binder, between 35 and 50 wt % of an agent which is both a filler and a pH buffering agent, between 0.1 and 1 wt % polymer thickener, and between 1 and 2.2 wt % NBTPT.

\* \* \* \* \*